(12) United States Patent
Blumer et al.

(10) Patent No.: US 7,798,408 B2
(45) Date of Patent: Sep. 21, 2010

(54) APPARATUS AND METHODS FOR CONTROLLING AN IMAGER

(75) Inventors: Larry L. Blumer, Concord, NC (US); Daniel Duane Yeakley, Monroe, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 469 days.

(21) Appl. No.: 11/456,240

(22) Filed: Jul. 10, 2006

(65) Prior Publication Data

US 2008/0121711 A1 May 29, 2008

(51) Int. Cl.
*G06K 7/10* (2006.01)

(52) U.S. Cl. .............. 235/462.01; 235/375; 235/462.41; 235/472.01; 382/313

(58) Field of Classification Search ............ 235/462.23, 235/462.41, 462.01, 375, 742.01; 382/313
See application file for complete search history.

(56) References Cited

U.S. PATENT DOCUMENTS

| | | | |
|---|---|---|---|
| 4,091,270 A | 5/1978 | Musch et al. | |
| 4,825,058 A | 4/1989 | Poland | |
| 4,868,375 A | 9/1989 | Blanford | |
| 5,256,865 A | 10/1993 | Wike, Jr. et al. | |
| 5,777,315 A | 7/1998 | Wilz et al. | |
| 5,837,986 A | 11/1998 | Barile et al. | |
| 5,848,064 A | 12/1998 | Cowan | |
| 5,910,653 A * | 6/1999 | Campo | 250/214 AL |
| 6,321,989 B1 | 11/2001 | Wilz, Sr. et al. | |
| 6,347,743 B2 | 2/2002 | Wilz, Sr. et al. | |
| 6,507,856 B1 | 1/2003 | Chen et al. | |
| 6,539,422 B1 | 3/2003 | Hunt et al. | |
| 6,540,142 B1 | 4/2003 | Alleshouse | |
| 6,568,596 B1 | 5/2003 | Shaw | |
| 6,655,593 B2 | 12/2003 | Alleshouse | |
| 6,697,805 B1 | 2/2004 | Choquier et al. | |
| 6,764,009 B2 | 7/2004 | Melick et al. | |
| 6,764,011 B2 | 7/2004 | Entani | |
| 6,772,947 B2 | 8/2004 | Shaw | |
| 6,776,342 B1 | 8/2004 | Thuries et al. | |
| 6,902,114 B2 | 6/2005 | Hashimoto et al. | |
| 6,908,034 B2 | 6/2005 | Alleshouse | |
| 2004/0016814 A1 * | 1/2004 | Muramatsu | 235/462.41 |
| 2004/0189825 A1 * | 9/2004 | Kawashima | 348/231.3 |
| 2007/0131774 A1 * | 6/2007 | Celestini | 235/462.45 |

* cited by examiner

*Primary Examiner*—Daniel A Hess
*Assistant Examiner*—Rafferty Kelly
(74) *Attorney, Agent, or Firm*—Hiscock & Barclay, LLP

(57) ABSTRACT

A method of controlling an imager in a portable data collection device. A plurality of data structures are created with each containing a set of values for controlling an exposure process of an imager in a portable data collection device. One of the plurality of data structures is selected and the values therein are applied to the imager. Thereafter, a frame is captured by the imager and outputted.

14 Claims, 10 Drawing Sheets

APPARATUS AND METHODS FOR CONTROLLING AN IMAGER

BACKGROUND OF THE INVENTION

The term Portable data terminal (PDT) refers to data collection devices used to collect, process and transfer data to a larger data processing system. Most PDTs are ruggedized to some extent for use in industrial environments. The tougher the environment, the more robust the PDT. PDT's are available from several sources, including the assignee of the present application: HAND HELD PRODUCTS. INC.

A PDT generally comprises a mobile computer, a keypad and a data acquisition device. The mobile computer generally comprises a hand held (or "pocket") computing device, such as those available from INTEL. PALM, HEWLETT PACKARD, and DELI. Keypads come in a variety of alpha-numeric and numeric configurations. The data acquisition device generally comprises a device that captures data from, for example, radio frequency IDs (RFID), images, and bar codes. Data may also be captured via keypad entry and utilization of a touch pad associated with the mobile computer.

FIG. 1A is a perspective view of a known PDT 100. FIG. 1B is a plan view of the known PDT 100. The illustrated example utilizes a popular form factor incorporating a body 102 and a handle 101. The body 102 generally supports a variety of components, including: a battery (not shown but typically located the rear half of the body); an LCD with touch screen 106; a keyboard 108 (including a scan button 108a); a scan engine 110; and a data/charging port 112 (not fully illustrated). The scan engine 110 may comprise, for example, an image engine or a laser engine. The data/charging port 112 typically comprises a proprietary (and often expensive) interface with one set of pins or pads for the transmitting and receiving of data and a second set of pins or pads for receiving power for powering the system and/or charging the battery.

The handle 101, extending from a bottom surface of the body 102, incorporates a trigger 1114. In use, the user may actuate either the scan key 108a or the trigger 114 to initiate a frame capture via the image engine 110. The captured frame may either be processed as an image or as a data carrier. In the first case, the captured frame may undergo some post capture image processing, such as de-speckling or sharpening and then stored as an image file (e.g. a bitmap, jpeg of gif file) and possibly displayed. In the second case the captured frame also undergoes some post capture image processing but the image is then analyzed, e.g. decoded, to identify data represented therein. The decoded data is stored and possibly displayed on the PDT 100. Additional processing of the image or data may take place on the PDT 100 and/or a data processing resource to which the data is transmitted via any available transport mechanism on the PDT 100. Some examples of known transport mechanisms utilized by PDT's include: Bluetooth, WiFi. GSM, CDMA, USB. IrDA, removable FLASH memory, parallel and serial ports (including for example. RS-232).

Imagers have a plurality of settings that may be adjusted. These settings, including gain and shutter speed, affect the image acquisition process and typically affect the image captured. A variety of functions, designed to modify captured images are often provided in software or firmware associated with the imager. Examples of these functions include sharpness and edge algorithms. Between the settings and functions, the user of an imager based PDT is faced with large number of choices, any of which may dramatically affect the final image outputted by the system. PDTs with other data capture devices, such as RFID or magstripe readers, may also be faced with a similar array of choices. The present inventors have recognized a need to simplify control of parameters associated with controlling a data capture process on a PDT.

BRIEF DESCRIPTION OF THE DRAWINGS

An understanding of the present invention can be gained from the following detailed description of the invention, taken in conjunction with the accompanying drawings of which.

DETAILED DESCRIPTION

Figure 1A:
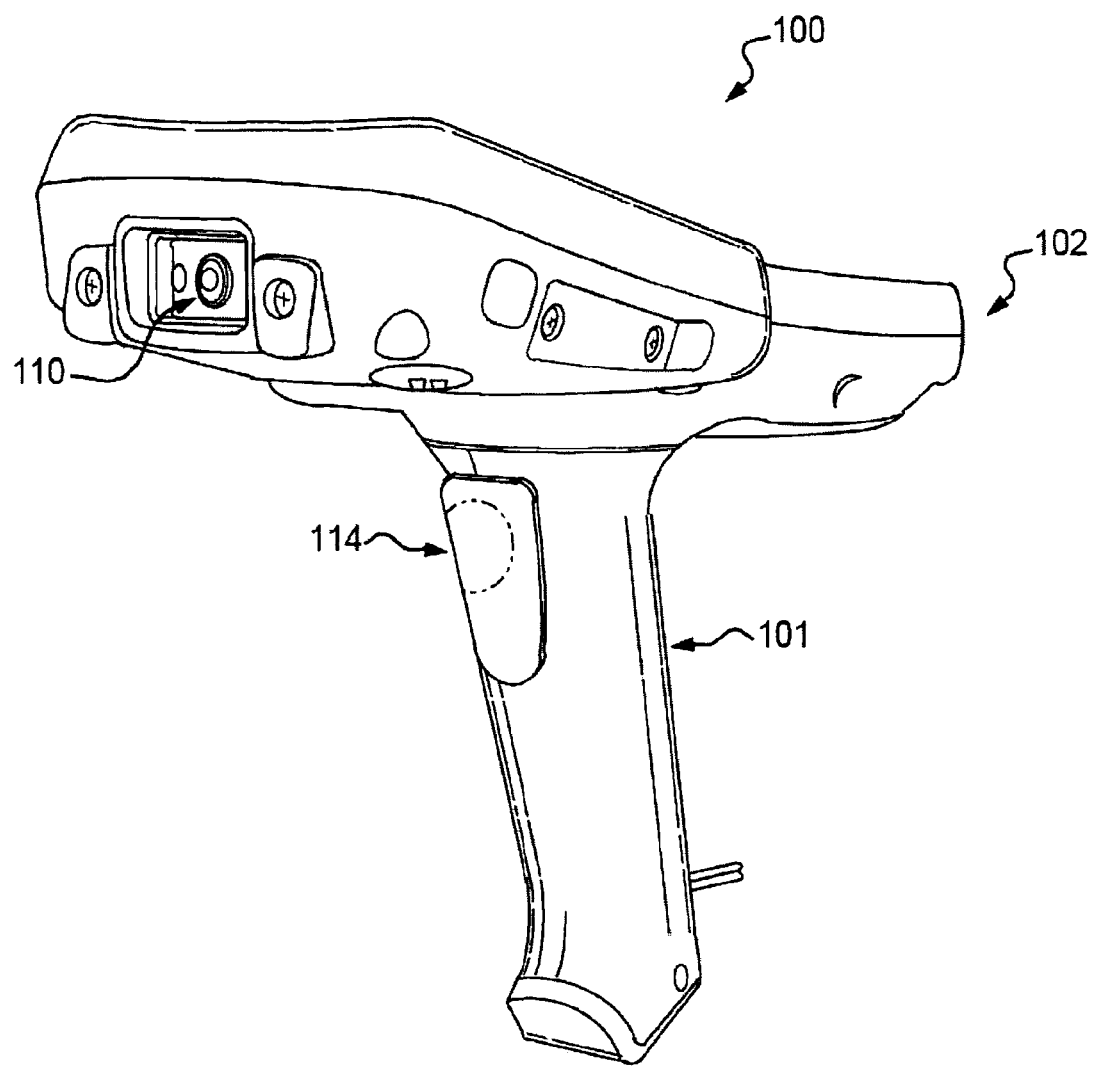
FIG. 1A is an orthogonal view of a known PDT.
Figure 1B:
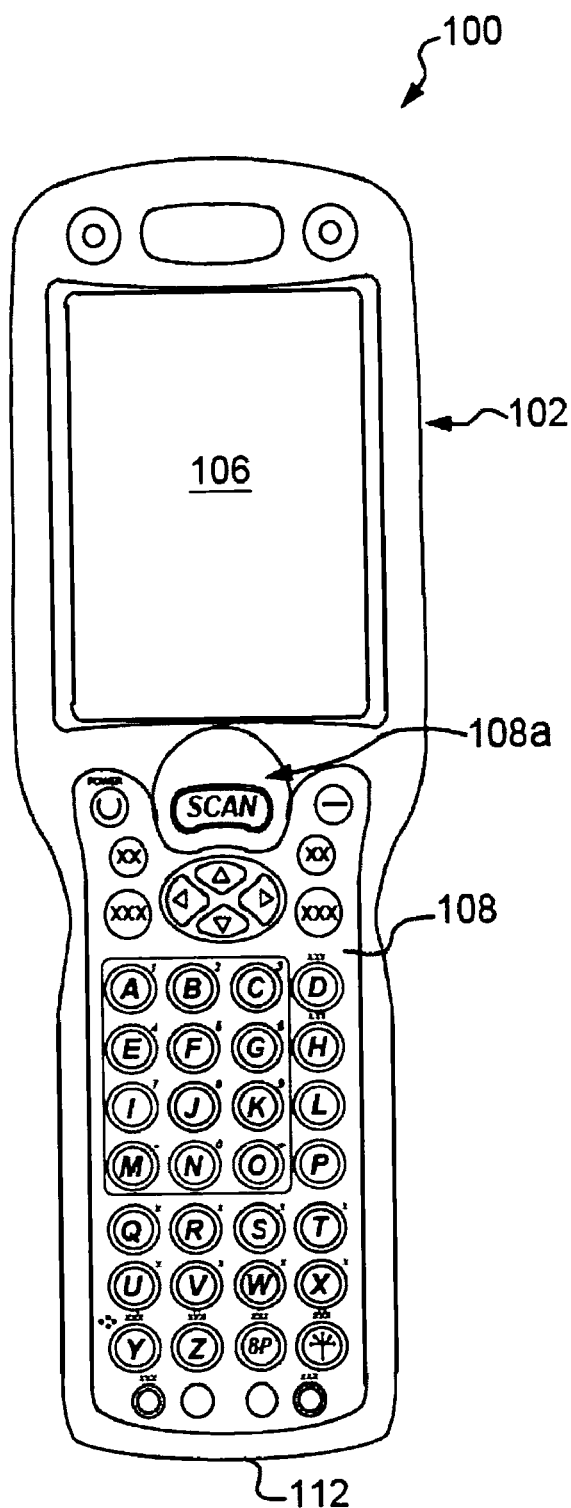
FIG. 1B is a plan view of a known PDT.

Reference will now be made in detail to the present invention, examples of which are illustrated in the accompanying drawings, wherein like reference numerals refer to like elements throughout. The following description will use nomenclature associated with an imager based PDT, however those of ordinary skill in the art will recognize that the present invention is applicable to a variety of portable devices including RF or magstripe based PDTs, personal data assistants (PDAs): bar code scanners, and consumer electronics, for example digital cameras, cellular phones, and the like. It is anticipated that many such portable devices would benefit from the present invention, including the embodiments thereof described herein.

A method is here, and generally, conceived to be a sequence of steps or actions leading to a desired result and may be implemented as software. While it may prove convenient to discuss such software as if it was embodied by a single program, most implementations will distribute the described functions among discrete (and some not so discrete) pieces of software. These pieces are often described using such terms of art as "programs." "objects." "functions." "subroutines," "libraries," ".dlls." "APIs." and "procedures." While one or more of these terms may find favor in the present description, there is no intention to limit the invention to the described configurations.

In general, the sequences of steps in the present methods require physical manipulation of physical quantities. These quantities take the form of optical, electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities.

With respect to the software described herein, those of ordinary skill in the art will recognize that there exist a variety of platforms and languages for creating software for performing the methods outlined herein. Embodiments of the present invention can be implemented using MICROSOFT VISUAL STUDIO or any number of varieties of C. However, those of ordinary skill in the art also recognize that the choice of the exact platform and language is often dictated by the specifics of the actual system constructed, such that what may work for one type of system may not be efficient on another system. It should also be understood that the methods described herein are not limited to being executed as software on a computer or DSP (Digital Signal Processor), but can also be implemented in a hardware processor. For example, the methods could be implemented with HDL (Hardware Design Language) in an ASIC.

In the present description, an element number followed by a letter generally indicates multiple occurrences of similar, either in structure or function, elements. Further, the use of an italicized "n" (e.g. n) associated with an element number generally denotes either an unspecified one of such elements or a partial or complete group of such elements—the meaning of which is to be drawn from the context of such use.

Figure 2:
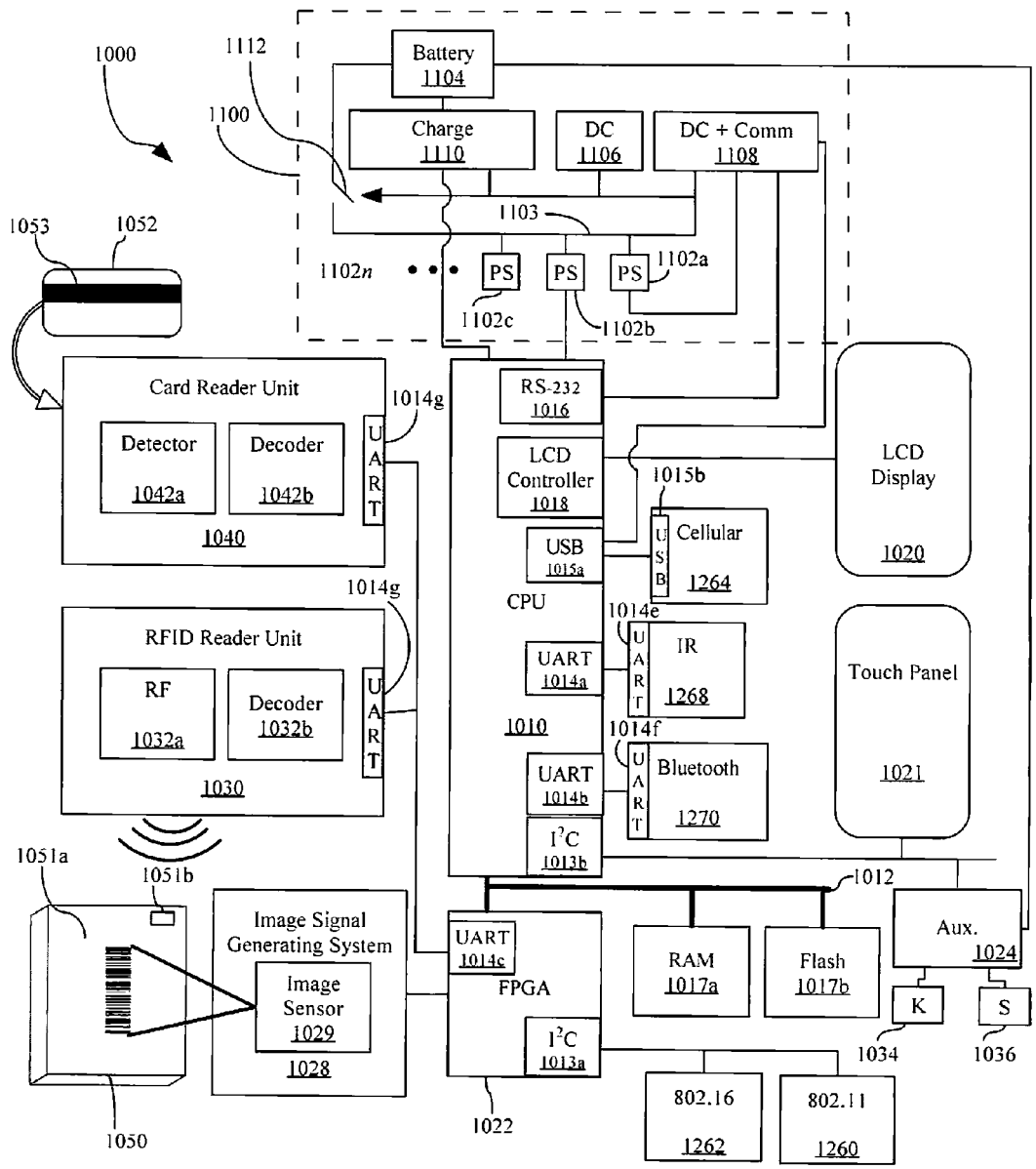
FIG. 2 is a block diagram of a PDT in accordance with an embodiment of the present invention.

FIG. 2 is a block diagram of a PDT 1000 in accordance with an embodiment of the present invention. Those of ordinary skill in the art will recognize that the illustrated design of the PDT 1000 has been simplified so as to permit a briefer explanation of systems and components not directly related to the present invention.

A central processing unit (CPU) 1010 receives data from and outputs data to other sub-systems for storage, transmission and additional processing. CPU 1010 may be implemented using any number of off the shelf solutions including: embedded processors, such as an XSCALE processor available from INTEL: general purpose processors, such as a PENTIUM 4 available from INTEL; or any number of custom solutions including pre-configured field programmable gate arrays (FPGAs) and application specific integrated circuits (ASICs). Overall operation of the CPU 1010 is controlled by software or firmware, typically referred to as an operating system, stored in one or more memory locations 1017*n*, including RAM 1017*a* and FLASH memory 1017*b*. Examples of suitable operating systems for PDT 1000 include: WINDOWS MOBIL, WINDOWS CE. WINDOWS XP, LINUX, PALM, and OSX.

In general, communication to and from the CPU 1010 and the various sub-components takes place via one or more ports or busses, including a main system bus 1012; I²C busses 1013*a* and 1013*b*; a plurality of Universal Asynchronous Receivers/Transmitter (UART) ports 1014*n*, a Universal Serial Bus (USB) 1015*n*, and an RS-232 port 1016.

The illustrated CPU 1010 also includes a liquid crystal display (LCD) controller 1018 for controlling an LCD 1020. A touch sensitive panel 1021, which may be in communication with one or more of the CPU 1010 and an auxiliary processor 1024 via the I²C bus 1013*b*, may be associated with the LCD 1020 for receipt of data thereon. The combination of the LCD 1020 and the touch sensitive panel 1021 is often referred to as a "touch screen."

A variety of secondary processors may be provided to perform general and application specific functions. The example illustrated in FIG. 2 provides two such processors: a field programmable gate array (FPGA) 1022 and the auxiliary processor 1024. The FPGA 1022 may comprise any number of FPGA including the Virtex-4 family available from XILINX. The auxiliary processor 1024 may comprise any number of embedded (or general purpose) processors, including the PICmicro® family of microcontrollers available from MICROCHIP TECHNOLOGY.

The auxiliary processor 1024 may interface with and control a variety of data input devices including, for example, the touch panel 1021, a keyboard 1034 and a scan button 1036. By way of example, the PDT 1000 may be configured so that displayed menu options are selected by physically depressing a key on the keyboard 1034 or activating the touch screen 1021 with use of a finger or stylus. The scan button 1036 may be used for initiating and controlling the various data collection systems, such as an image signal generating system 1028, an RFID sensing system 1030, or a magnetic stripe reader 1040.

The data collection systems (e.g. the image signal generating system 1028, the RFID sensing system 1030, and the magnetic stripe reader 1050) may be controlled by one or more of the CPU 1010, the auxiliary processor 1024, and the FPGA 1022. In this case, the FPGA 1022 initiates and controls the operation of the data collection systems and accumulates data received there from prior to depositing such data in memory 1017*n*. Possible configurations of FPGA 1022 are illustrated in U.S. Pat. No. 6,947,612 incorporated herein by reference.

The image signal generating system 1028 generally comprises a two dimensional solid state image sensor 1029 utilizing such technologies as CCD, CMOS, and CID, for capturing an image containing data, e.g. a bar code or signature. Two-dimensional solid state image sensors generally have a plurality of photo sensor picture elements ("pixels") which are formed in a pattern including a plurality of rows and a plurality of columns of pixels. The image signal generating system 1028 further includes an imaging optics (not shown) focusing an image onto an active surface of the image sensor 1029. Image sensor 1029 may be incorporated on an image sensor IC chip having disposed thereon image sensor control circuitry, image signal conditioning circuitry, and an analog-to-digital converter. FPGA 1022 manages the capture and transfer of image data into RAM 1017*n*. Decoding may be performed by the CPU 1010 or any suitable secondary processor. Examples of devices suitable for use as the imaging assembly 1028 include an IMAGETEAM 5x00VGA/5x00MPX imaging module of the type available from Hand Held Products, assignee of the present application. A variety of alternatives, including dedicated laser barcode scanners may also be utilized.

One use of the image signal generating system 1028 is for reading and interpreting bar codes such as bar code 1051*a* on an item 1050. For this operation, when the scan button 1036 is actuated, the CPU 1010 causes the appropriate control signals to be sent to the image sensor 1029. In response thereto, the image sensor 1029 outputs digital image data including (hopefully) an adequate representation of the bar code symbol 1050. The digital image data is streamed to the FPGA 1022 where it is collected and subsequently deposited in memory 1017*n*. In accordance with a decoding program (not specifically illustrated) an attempt may be made to decode the bar code represented in the captured electronic image representation. The capture and decoding of image data may occur automatically in response to a trigger signal being generated, usually by activation of the scan button 1036 or a pre-selected key on keyboard 1034. For example, the CPU 1010 may be configured, typically through execution of a program resident in memory 1017n, to continuously capture and decode bar code symbols represented therein as long as scan button 1036 is actuated. The cycle may be terminated upon successfully decoding the bar code symbol or by timing out after a number of unsuccessful attempts.

In addition to having a decode operation, the image signal generation system 1028 may also be configured for an image capture operation. In an image capture operation, control circuit 1010 captures an electronic image representation in response to the scan button 1036 being actuated without attempting to decode a decodable symbol represented therein. The captured electronic image representation may be one or more of (i) stored into a designated memory location of memory 1017n, (ii) transmitted to an external spaced apart device, or (iii) displayed on LCD 1020. This mode may be used to capture, for example an image of a signature or damage to a package.

In an image capture operation, the image signal generation system 1028 may be operated in two distinct stages: aiming and final capture. During the aiming stage, frames output by the image signal generation system 1028 are displayed on the LCD display 1020. These frames are not saved. Once a user is satisfied with the content of the image displayed on the LCD display 1020, he or she initiates the final capture stage. In final capture stage, a frame (either the frame currently in the buffer or a next frame) is saved and typically displayed on the LCD 1020. Generally, the aiming stage is initiated by pressing a designated button (such as a scan button 1036) with the final capture stage being initiated by releasing the designated button. It is generally desirable to display frames as quickly as possible in the aiming stage to ensure that the user is viewing a recently outputted fame. Otherwise there is a danger that the frame the user views when deciding to initiate capture is outdated and does not accurately reflect what the image signal generating system 1028 is currently outputting (and what will be captured in final capture stage).

The RFID reader unit 1030 includes an RF oscillation and receiver circuit 1032a and a data decode processing circuit 1032b. RFID reader unit 1030 may be configured to read RF encoded data from a passive RFID tag, such as tag 1051b, which may be disposed on article 1050.

Where the RFID reader unit 1032a is configured to read RF encoded data from a passive RFID tag, the RF oscillation and receiver circuit 1032a transmits a carrier signal to the passive tag which in turn converts the carrier energy to voltage form and actuates a transponder (not shown) to transmit a radio signal representing the encoded tag data. The RF oscillator and receiver circuit 1032a, in turn, receives the radio signal from the tag and converts the data into a digital format. The data decode processing circuit 1032b, typically including a low cost microcontroller IC chip, decodes the received radio signal information received by RF oscillator and receiver circuit 1032a to decode the encoded identification data originally encoded into RFID tag.

RFID reader unit 1030 may, for example, operate in a selective activation mode or in a continuous read operating mode. In a selective activation mode RFID reader unit 1030 broadcasts radio signals in an attempt to activate a tag or tags in its vicinity in response to an RFID trigger signal being received. In a continuous read mode, RFID reader module 1030 continuously broadcasts radio signals in an attempt to actuate a tag or tags in proximity with unit automatically, without module 1030 receiving a trigger signal. PDT 1000 may be configured so that the CPU 1010 recognizes a trigger signal under numerous conditions, such as: (1) the trigger 1034 is actuated: (2) an RFID trigger instruction is received from a remote device; or (3) the CPU 1010 determines that a predetermined condition has been satisfied.

Still further, the PDT 1000 may include a card reader unit 1040 for reading data from a card 1052. Card reader unit 1040 generally comprises a signal detection circuit 1042a and a data decode circuit 1042b. In operation, the signal detection circuit 1042a detects data, from for example a magnetic strip 1053 on a card 1052. Subsequently, the data decode circuit 1042b decodes the data. The decoded data may be transmitted to the CPU 1010 for further processing via the FPGA 1022. The card reader unit 1040 can be selected to be of a type that reads card information encoded in more than one data format. For example, the card reader unit 1040 may comprise a Panasonic ZU-9A36CF4 Integrated Smart Reader capable of reading any one of magnetic stripe data, smart card or Integrated circuit card (IC card) data, and RF transmitted data.

A power circuit 1100 supplies power to the PDT 1000. The power circuit 1100 generally comprises a series of power supplies 1102n that regulate the power supplied to the various components of the PDT 1000. The power supplies 1102n each generally comprise step up or step down circuits which are in turn connected to each of the various components in the PDT 1000 that require the particular voltage output by that power supply 1102n.

The power supplies receive current from a power bus 1103 which is, in turn, supplied by one of a battery 1104, a first power input 1106 or a connector 1108 that includes a second power input. The first power input 1106 may comprise a DC power jack, for example, a 2.5 mm coaxial DC power plug which receives 9.5 volts from a conventional AC/DC transformer. The connector 1108 may comprise any number of known connection technologies, such as the D Series of circular plastic connectors or the HCL D-sub derivative design data transfer connector available from HYPERTRONICS, INC. Certain pins of the connector 1108 may be dedicated to receiving DC power, for example 9.5 volts, while other pins are dedicated to one or more communication paths. e.g. RS-232 and USB. It may also prove advantageous to provide DC power out, for example from a power supply 1102a, so as to power tethered accessories, such as external magnetic stripe or RFID readers (not shown). It may prove further advantageous to add circuitry to insulate the first power input 1106 from the second power input on the connector 1108 and other components in the PDT 1000 in the event that a user attempts to supply power to both power inputs.

The battery 1104 may be selected from any of a variety of battery technologies including fuel cell, NiMh. NiCd, Li Ion, or Li Polymer. The battery 1104 is charged by a charge circuit 1110 which receives power from either the first power input 1106 or the second power input on the connector 1108. The charge circuit may comprise any of a number of available circuits. In the example shown in FIG. 2, control is provided to the CPU 1016 which may modify the charging behavior of the charge circuit 1110 based on information generated by the auxiliary processor 1024. In this example, the auxiliary processor 1024 monitors battery chemistry, such as gas content, via known interfaces, such as the SMART battery interface as specified by the Smart Battery System Implementers Forum. A switch 1112 isolates the battery based upon the presence of power from the first power input 1106 or the second power input on the connector 1108. Thus, when an external power supply is connected to either the power input 1106 or the second power input on the connector 1108, the battery is isolated from the power supplies 1102n and may be charged via the charge circuit 110. Once power is removed from the power input 1106 and the connector 1108, the battery is connected to the power supplies 1102n.

The PDT 1000 may further include a plurality of wireless communication links such as an 802.11 communication link 1260, an 802.16 communication link 1262, a communication link 1264 for communication with a cellular network such as a network in accordance with the Global System for Mobile Communications (GSM), an IR communication link 1268, and a Bluetooth communication link 1270. Each of these links facilitates communication with a remote device and may be used to transfer and receive data.

Figure 3:
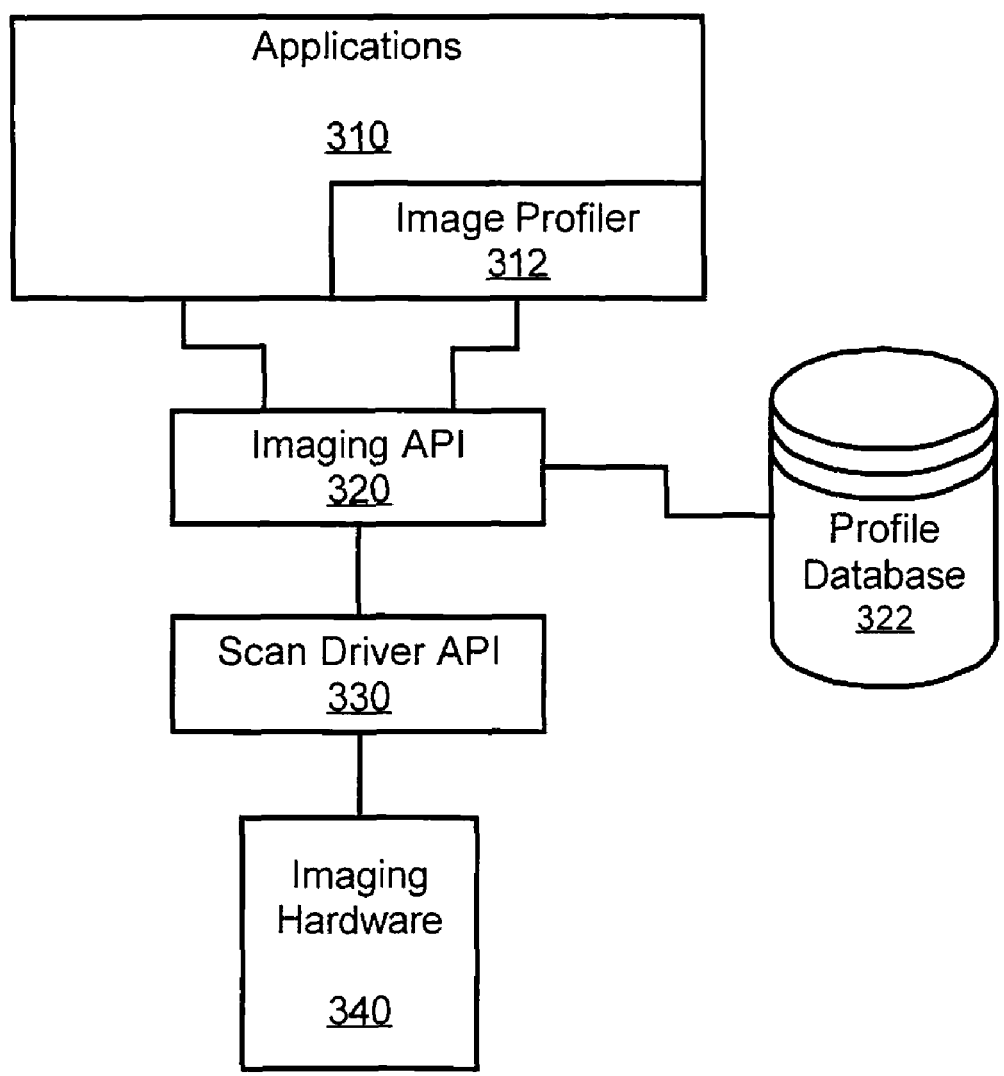
FIG. 3 is a diagram illustrating an architecture useful for describing an embodiment of the present invention.

FIG. 3 is a diagram illustrating architecture useful for describing an embodiment of the present invention. The architecture generally comprises four levels; an application level 310; an imaging API (application programming interface) level 320; a scan driver API level 330; and an imaging hardware level 340.

An application programming interface (API) is a set of routines that a computer system, library or application provides to allow requests for service from other computer programs, and/or to facilitate the exchange of data. Generally, an API is designed to simplify use of, abstract, or extend a lower level entity. Many times this simplification takes the form of collecting and ordering a set of lower level commands to accomplish a function. Thus, referring to the architecture illustrated in FIG. 3, the scan driver API 330 provides a set of routines that simplifies use of the imaging hardware 340. In turn, the imaging API 320 provides a set of routines that extend use of the scan driver API 330.

The imaging hardware 340 generally comprises the image generating system 1028 including the image sensor 1029. The imaging hardware 340 is generally responsive to the contents of registers and the voltage level applied to a set of pins. For example illumination of LEDs associated with the image signal generation system 1028 may be adjusted based on a signal supplied to a selected pin. By way of another example, gain applied to the output of the charge couple devices forming the imager (corresponding to an ISO setting) may be responsive to values stored in a register. It is to be understood that different manufactures of different imagers will provide different capabilities, with varying settings and functions used to access those capabilities.

The scan driver API 330 provides a software interface to imaging hardware 340. In other words, the scan driver API 330 provides software callable routines for setting the registers and supplying voltage to pins used to control the imaging hardware 340. The scan driver API 330 may, for example, provide routines that: turns illumination on or off; turns an aimer on or off; initiates image capture; and retrieves an image. Table 1 sets forth an example list of routines that may be provided in a scan driver API 330.

TABLE 1

| ROUTINE | DESCRIPTION |
| --- | --- |
| HANDLE HHPSI_OpenSessionWithScanEngine(void) | Opens a session to the scan driver and returns a HANDLE that identities the session. |
| DWORD HHPSI_CloseSessionWithScanEngine(HANDLE hSession) | Closes an already opened session to the scan driver |
| void *HHPSI_ReserveAndRegisterScanSpace(HANDLE hSession) | Allocates a DMA/image buffer |
| DWORD HHPSI_UnregisterAndFreeScanSpace(HANDLE hSession,void *pImageVirtualAddress) | Frees previously allocated DMA/image buffer |
| DWORD HHPSI_GetNewScan(HANDLE hSession,void *pImageVirtualAddress) | Retrieves an image from the scan driver. This is called after scanning has started |
| DWORD HHPSI_StartScanning(HANDLE hSession) | Starts scanning. While scanning is started all images produced by the imager are captured in streaming mode |
| DWORD HHPSI_StopScanning(HANDLE hSession) | Stops scanning. (Undoes HHPSI_StartScanning) |
| DWORD HHPSI_GetSingleFrame(HANDLE hSession,void *pImageVirtualAddress) | Get a single frame. This starts up image capture long enough to capture an image, then stops image capture and returns the captured image |
| BOOL HHPSI_GetScanEngineType( HANDLE hSession,DWORD *pdwEngineType) | Identifies the type of scan engine |
| BOOL HHPSI_GetScanEngineProperties( HANDLE hSession,PHHP_SCANENGINE_PROPERTIES pScnEngProp ) | Retries properties from the scan engine |
| BOOL HHPSI_SetIlluminationLEDState( HANDLE hSession,BOOL bSetOn ) | Turns the illumination on or off |
| BOOL HHPSI_SetAimerLEDState( HANDLE hSession,BOOL bSetOn ) | Turns the aimers on or off |
| BOOL HHPSI_SetScanningLightsMode( HANDLE hSession,DWORD dwMode) | Set the lighting mode |
| BOOL HHPSI_SetExposureMode( HANDLE hSession,DWORD dwMode) | Set the exposure mode |
| BOOL HHPSI_SetExposureSettings( HANDLE hSession,DWORD *pdwArray, DWORD dwArrayLength) | Sets exposure settings. (Such as exposure method, target illumination value, acceptance gap, histogram percentile. max exposure/gain, min exposure/gain, fixed exposure/gain) |

TABLE 1-continued

| ROUTINE | DESCRIPTION |
|---|---|
| BOOL HHPSI_GetExposureSettings( HANDLE hSession,DWORD *pdwArray, DWORD dwArrayLength) | Retrieves the exposure settings. (See HHPSI_SetExposureSettings) |
| BOOL HHPSI_GetDllRevision(TCHAR* pszRev) | Retrieves the scan interface reversion number |
| BOOL HHPSI_GetScanDriverRevision(HANDLE hSession, TCHAR* pszRev) | Retrieves the scan driver revision number |
| BOOL HHPSI_PowerOffImager(HANDLE hSession) | Remove power from the imager |
| BOOL HHPSI_GetImageAttributes( HANDLE hSession,BYTE *pImage, DWORD *pdwArray, DWORD dwArrayLength) | Retrieve attributes of the image |
| BOOL GetEngineID(int *pEngineID) | Retrieve engine ID |
| BOOL GetEngineType(BYTE *pEngineType) | Retrieve engine type |
| BOOL GetImagerProperties(PHHP_SCANENGINE_PROPERTIES pScnEngProp ) | Retrieve imager properties |

The imaging API 320 provides a set of libraries and tools to help software developers create applications that utilize the PDT's 1000 image generation system 1028 for capturing, manipulating and saving images. Developers of applications 310 interface with the imaging API 320, the scan driver API 330, and the imaging hardware 340 by using the calls provided by the imaging API 320. Functionally, the imaging API 320 provides a set of routines that facilitate the capture and manipulation of one or more images.

More to the point, the imaging API 320 provides access to a variety of different types of settings and functions useful for the capture and post processing of frames. The examples discussed herein will focus on three types of settings and functions: exposure settings; aimer/illumination settings; and post capture image processing functions (hereinafter referred to as "image functions"). Exposure, aimer and illumination settings provide access to settings within the imaging hardware 340 that affect the capture of one or more images (also referred to as frames). In particular, aimer and illumination settings generally comprise indications of whether illumination (generally comprising LEDs on the imaging hardware 340) is to be utilized and whether an aimer (perhaps comprising LEDs with a diffraction screen or a laser) is to be projected. Exposure settings generally refer to values that affect the exposure process of the imaging hardware 340. Image functions are a suite of routines that manipulate an existing image and include such functions as de-speckle and sharpen.

A representative group of image based settings and functions are described herein below. It is to be recognized that, depending on the imaging hardware 340, other settings and functions may be available. It is also to be recognized that a similar set of settings and functions may be provided for decoding operations.

Table 2 sets forth an example list of routines that may be provided in an imaging API 320 for adjusting settings related to the capture and display of frames.

TABLE 2

| ROUTINE | DESCRIPTION |
|---|---|
| imgCaptureImage | Capture image data into the specified buffer. |
| imgCheckImager | Check for a valid imager. |
| imgDisplayImage | Display a full frame or preview image from the captured camera data. |
| imgInitCamera | Initialize the imager using an optional imaging profile. |

TABLE 2-continued

| ROUTINE | DESCRIPTION |
|---|---|
| imgLoadIQCameraData | Loads IQ Imaging data into the specified buffer. |
| imgSetAimer | Turn on and off the device aimer. |
| imgSetExposureMode | Selects the exposure mode to be used during image acquisition. |
| imgSetExposureSettings | Sets imager exposure settings. |
| imgSetIllumination | Turn on and off device illumination. |
| imgStartCapture | Starts image capturing. |
| imgStopCapture | Stops image capturing |
| imgUninitCamera | Uninitialize the imager. |
| imgLoadBMP | Load the specified bmp file. |
| imgLoadJPG | Load the specified jpg file. |
| imgLoadPNG | Load the specified png file. |
| imgSaveBMP | Save the specified bmp file. |
| imgSaveJPG | Save the specified jpg file. |
| imgSavePNG | Save the specified png file. |
| imgBitCount | Returns the bit count for the specified hdib. The bit count is the number bits required to represented one pixel. |
| imgBitmapHandle | Returns a handle to a device-independent bitmap for the specified image buffer. |
| imgBitsPtr | Returns a pointer to the image data for the the specified image buffer. |
| imgConfigDebug | Configure the debug output for the imaging library. |
| imgCopyHDIB | Make a copy of the specified image buffer (HDIB). |
| imgCreateHDIB | Create an image buffer. The developer must call imgUnloadHDIB( ) to release memory allocated by imgCreateHDIB( ). |
| imgHeight | Returns the height of the specified image. |
| imgInfoHeaderPtr | Returns a BITMAPINFOHEADER structure for the specified image. |
| imgNumColors | Returns the number of colors in the specified. |
| imgUnloadHDIB | Unload the specified image. |
| imgWidth | Returns the width of the specified image. |

In the example illustrated in Table 2, exposure settings are set using the imgSetExposureSettings call. Exposure settings are generally dictated by the collection of possible settings allowed by particular imaging hardware and which of those settings are exposed by the scan driver API 330. Thus, the available parameters may vary between different imaging hardware. Table 3 sets forth an example list of exposure settings that may be provided in association with an imaging API 320. In this example, the imager may operate in one of two modes: automatic or manual (set using the imgSetExposureMode call).

TABLE 3

| EXPOSURE SETTINGS | EXPOSURE MODE | DESCRIPTION |
| --- | --- | --- |
| IMG_ES_EXPOSURE_METHOD | automatic | Set to one of the following: IMG_AE_METHOD_UNIFORM: Uses all image data when calculating automatic exposure setting AE_METHOD_CENTER_ONLY: Uses only the data in the center of the image when calculating automatic exposure setting AE_METHOD_CENTER_WEIGHTED: Uses all image data, but weights the data in the center of the image more heavily when calculating automatic exposure setting |
| IMG_ES_TARGET_VALUE | automatic | The auto exposure algorithm tries to get a given percentile of all of the pixel values of the image, to fall at a target value. This parameter specifies the desired target value. The default value for this parameter is 150, with a minimum of 1 and a maximum of 255. |
| IMG_ES_TARGET_PERCENTILE | automatic | The auto exposure algorithm tries to get a given percentile of all of the pixel values of the image, to fall at a certain value. This parameter sets where that percentile is in the image data. This value is configurable between 1 and 99, where 1 represents the darkest percentile of the image, and 99 represents the lightest percentile of the image. |
| IMG_ES_TARGET_ACCEPT_GAP | automatic | This specifies how far the pixel value of the TargetPercentile can stray from the TargetValue but still be considered an acceptable image. The default value for this parameter is 10, the minimum value is 1 and the maximum value is 50. It should be noted however that as this value gets smaller, the time to acquire a conforming image might be lengthened. |
| IMG_ES_MAX_EXP | automatic | This specifies the maximum exposure value to be used by the auto exposure logic during image acquisition. The default value for this parameter is 1312, the minimum value is 1 and the maximum value is 7874, in units of 127 uS. It should be noted that this parameter would allow for the adjustment of the frame rate of the imager to achieve larger exposure times; therefore it will affect the speed at which the imager acquires an image. |
| IMG_ES_MAX_GAIN | automatic | This specifies the maximum gain value to be used by the auto exposure logic during image acquisition. The default value for this parameter is 1, the minimum value is 1 and the maximum value is 4. |
| IMG_ES_FRAME_RATE | automatic | This parameter defines the starting frame rate to be used by the auto exposure logic during image acquisition. The default value for this parameter is 30, the minimum value is 1 and the maximum value is 30. |
| IMG_ES_CONFORM_IMAGE | automatic | Where the auto exposure software is always trying to get the TargetPercentile of pixel data to fall at the TargetValue, this parameter tells the image acquisition software that the acquired image must conform to the defined imager settings, (target percentile, target value, number of updates). The default value for this parameter is 0 for false, indicating that every image regardless of whether or not the target percentile of pixel values falls within the acceptance gap of the target value. |

TABLE 3-continued

| EXPOSURE SETTINGS | EXPOSURE MODE | DESCRIPTION |
|---|---|---|
| IMG_ES_CONFORM_TRIES | automatic | This specifies the maximum number of attempts that the auto exposure logic can use while attempting to acquire an image that conforms to the target values set up for the auto exposure algorithm, before considering the image as conforming. This parameter is only valid when the ImageMustConform value is set to 1 or true. The default value for this parameter is 6, the minimum value is 1 and the maximum value is 8. |
| IMG_ES_FIXED_EXPOSURE | fixed | This is the exposure setting when the exposure mode is fixed. The default value for this parameter is 255, the minimum value is 1 and the maximum value is 7874. |
| IMG_ES_FIXED_GAIN | fixed | This is the gain setting when the exposure mode is fixed. The default value for this parameter is 1, the minimum value is 1 and the maximum value is 4. |
| IMG_ES_FIXED_FRAME_RATE | fixed | This is the frame rate setting when the exposure mode is fixed. The default value for this parameter is 30, the minimum value is 1 and the maximum value is 30. |

Image functions generally comprise image manipulation methods applied to a captured frame. While image functions may be physically provided in a variety of forms and memory locations, it is convenient to think of them as being logically part of the imaging API 320. Table 4 sets forth one possible set of image functions:

TABLE 4

| IMAGE FUNCTIONS | DESCRIPTION |
|---|---|
| imgAverage | Remove noises and specks from the specified image. |
| imgBrightness | Adjust the brightness of the specified image. |
| imgClear | Clears the specified image and sets the background to the specified color. |
| imgContrast | Adjust the contrast of the specified image. |
| imgCrop | Crop the specified image. |
| imgDespeckle | Despeckle or remove noise from the specified image. |
| imgDither16Color | Convert the specified image to 16 colors using error diffusion dithering. |
| imgDither2Color | Convert the specified image to 2 colors using error diffusion dithering. |
| imgFlipHorizontal | Flip the specified image around the vertical axis. |
| imgFlipVertical | Flip the specified image around the horizontal axis. |
| imgGammaCorrection | Corrects the brightness levels in the specified image. |
| imgHistogramStretch | Dynamically adjust the image contrast by performing a linear histogram stretch. |
| imgHistogramStretchEx | Dynamically adjust the image contrast by performing a linear histogram stretch. |
| imgInfinityFilter | Sharpens and increases contrast in the specified image. |
| imgInvert | Inverts or creates a negative of the specified image. |
| imgOverlayBuffer | Overlay the specified text data on the specified image. |
| imgOverlayTimeDate | Overlay the time and date on the specified. |
| imgRankFilter | Apply the specified rank filter to the specified image. |
| imgScale | Scale the specified image. |
| imgSharpen | Sharpen the specified image. |

TABLE 4-continued

| IMAGE FUNCTIONS | DESCRIPTION |
|---|---|
| imgThreshold | Convert the specified image black and white. |
| imgTime | Modifies image to include an indication of capture time |
| imgDate | Modifies image to include an indication of capture date |

Any given set of settings and functions, along with parameters thereof may be assembled into a data structure termed herein an "image profile." An image profile may include indications of illumination/aimer settings, exposure settings and a list of image functions. The list of image functions describes an image processing sequence which may include multiple instances of any given image function. Image profiles may be implemented within the imaging API 320. In the present embodiment, the imaging API 320 is extended with routines for storing, retrieving, and loading image profiles in a profile database 322. Image profiles comprise one or more data structures representing a collection of settings for use of the imaging hardware 340 and instructions for executing image function on an image captured by the imaging hardware 340. The collection of the settings and instructions in a data structure facilitates the use of a single call, for example: imgInitCamera, to implement all of the settings and instructions contained within a data structure. This facilitates the creation of plural profiles, each directed toward a situation experienced by the user of the system. For example, one profile may be created for sunny situations, while another profile may be created for dark situations. Each of these profiles may be loaded (a process described with respect to FIG. 4A) by using the imgInitCamera call and passing a profile name. Table 5 illustrates some possible profiles:

TABLE 5

| PROFILE | DESCRIPTION |
| --- | --- |
| Low Light | Adjusts the intensity of the pixels to compensate for low light environments |
| Document | Applies gamma correction to increase readability of documents imaged from a medium distance away |
| Distant | Applies an infinity filter to enhance detail of objects imaged from a long distance away |
| Signature (BW) | Converts signatures imaged from a short distance away to black-and-white in order to create smallest possible image files. |
| Signature (GS) | Converts signatures imaged from a short distance away to black-and-white and back to greyscale in order to improve readability. |
| Normal | General purpose settings |

The use of a data structure to store aimer/illumination settings, exposure settings, and image functions simplifies storage and retrieval and facilitates the provision of solutions to various imaging challenges. Once the image profiles have been constructed, a single call will load an indicated image profile. By way of additional example, a reoccurring PDT technical support situation involves a user complaining about the performance of an imager in a PDT. Many times, the complaints arise from a particular set of circumstances in which the PDT is used—for example scanning under fluorescence lights as opposed to sunlight or the darkness of a delivery truck. The customer service representative can attempt to solve the issue by creating a profile and providing same to the customer without requiring the customer to set each setting or call each function individually.

Image profiles may utilize any number of data structures, including HTML, XML, comma delineated files, text files, records, or any number of common database file formats. By using a hierarchical document format, such as XML, multiple image profiles can easily be organized and stored in a single document. Table 6 provides an example of a document, in XML format, containing a plurality of image profiles. The profiles illustrated in Table 6, contains profiles corresponding to the example profiles described in Table 5. i.e.: Low Light; Document; Distant: Signature (BW); Signature (GS); and Normal.

TABLE 6

```
<?xml version="1.0"?>
<ConfigDoc desc="" name="MasterImagingProfiles">
   <HHPReserved desc="Hand Held Products Reserved Section">
      <Key name="XmlConfiguratorVersion">1.0.0</Key>
      <Key name="EXMVersion">1.0.1</Key>
   </HHPReserved>
   <Section name="Low Light" flags="8">
      <Section name="Automatic Exposure Control">
         <Key name="Exposure Method">0</Key>
         <Key name="Target Value">185</Key>
         <Key name="Target Percentile">65</Key>
         <Key name="Target Accept Gap">32</Key>
         <Key name="Max Exp">7874</Key>
         <Key name="Max Gain">4</Key>
         <Key name="Conform Image">0</Key>
         <Key name="Conform Tries">1</Key>
         <Key name="Specular Exclusion">0</Key>
         <Key name="Specular Sat">200</Key>
         <Key name="Specular Limit">1</Key>
      </Section>
      <Section name="Processing">
         <Section name="Gamma Correction">
            <Key name="Flags">1</Key>
            <Key name="Gamma">0.45</Key>
         </Section>
         <Section name="Rank Filter">
            <Key name="Flags">1</Key>
            <Key name="Rank">4</Key>
```

TABLE 6-continued

```
         </Section>
      </Section>
      <Section name="Settings">
         <Key name="Aimer">0</Key>
         <Key name="Illumination">1</Key>
      </Section>
   </Section>
   <Section name="Document" flags="8">
      <Section name="Automatic Exposure Control">
         <Key name="Exposure Method">0</Key>
         <Key name="Target Value">140</Key>
         <Key name="Target Percentile">65</Key>
         <Key name="Target Accept Gap">32</Key>
         <Key name="Max Exp">519</Key>
         <Key name="Max Gain">2</Key>
         <Key name="Conform Image">0</Key>
         <Key name="Conform Tries">1</Key>
         <Key name="Specular Exclusion">0</Key>
         <Key name="Specular Sat">200</Key>
         <Key name="Specular Limit">1</Key>
      </Section>
      <Section name="Processing">
         <Section name="Gamma Correction">
            <Key name="Flags">1</Key>
            <Key name="Gamma">0.45</Key>
         </Section>
      </Section>
      <Section name="Settings">
         <Key name="Aimer">0</Key>
         <Key name="Illumination">1</Key>
      </Section>
   </Section>
   <Section name="Distant" flags="8">
      <Section name="Automatic Exposure Control">
         <Key name="Exposure Method">0</Key>
         <Key name="Target Value">140</Key>
         <Key name="Target Percentile">65</Key>
         <Key name="Target Accept Gap">32</Key>
         <Key name="Max Exp">519</Key>
         <Key name="Max Gain">1</Key>
         <Key name="Conform Image">0</Key>
         <Key name="Conform Tries">1</Key>
         <Key name="Specular Exclusion">0</Key>
         <Key name="Specular Sat">200</Key>
         <Key name="Specular Limit">1</Key>
      </Section>
      <Section name="Processing">
         <Section name="Gamma Correction">
            <Key name="Flags">1</Key>
            <Key name="Gamma">0.45</Key>
         </Section>
         <Section name="Infinity Filter">
            <Key name="Flags">1</Key>
         </Section>
      </Section>
      <Section name="Settings">
         <Key name="Aimer">0</Key>
         <Key name="Illumination">1</Key>
      </Section>
   </Section>
   <Section name="Signature (BW)" flags="8">
      <Section name="Automatic Exposure Control">
         <Key name="Exposure Method">0</Key>
         <Key name="Target Value">140</Key>
         <Key name="Target Percentile">65</Key>
         <Key name="Target Accept Gap">32</Key>
         <Key name="Max Exp">519</Key>
         <Key name="Max Gain">1</Key>
         <Key name="Conform Image">0</Key>
         <Key name="Conform Tries">1</Key>
         <Key name="Specular Exclusion">0</Key>
         <Key name="Specular Sat">200</Key>
         <Key name="Specular Limit">1</Key>
      </Section>
      <Section name="Processing">
         <Section name="Threshold">
            <Key name="Flags">1</Key>
            <Key name="Level">70</Key>
         </Section>
```

TABLE 6-continued

```
    <Section name="Despeckle">
      <Key name="Flags">1</Key>
      <Key name="Threshold">3</Key>
      <Key name="Bkgcolor">0</Key>
    </Section>
  </Section>
  <Section name="Settings">
    <Key name="Aimer">0</Key>
    <Key name="Illumination">1</Key>
  </Section>
</Section>
<Section name="Signature (GS)" flags="8">
  <Section name="Automatic Exposure Control">
    <Key name="Exposure Method">0</Key>
    <Key name="Target Value">140</Key>
    <Key name="Target Percentile">65</Key>
    <Key name="Target Accept Gap">32</Key>
    <Key name="Max Exp">519</Key>
    <Key name="Max Gain">1</Key>
    <Key name="Conform Image">0</Key>
    <Key name="Conform Tries">1</Key>
    <Key name="Specular Exclusion">0</Key>
    <Key name="Specular Sat">200</Key>
    <Key name="Specular Limit">1</Key>
  </Section>
  <Section name="Processing">
    <Section name="Gamma Correction">
      <Key name="Flags">1</Key>
      <Key name="Gamma">0.45</Key>
    </Section>
    <Section name="Average">
      <Key name="Flags">1</Key>
    </Section>
    <Section name="Threshold">
      <Key name="Flags">1</Key>
      <Key name="Level">70</Key>
    </Section>
    <Section name="Average">
      <Key name="Flags">1</Key>
    </Section>
  </Section>
  <Section name="Settings">
    <Key name="Aimer">0</Key>
    <Key name="Illumination">1</Key>
  </Section>
</Section>
<Section name="Normal" flags="8">
  <Section name="Automatic Exposure Control">
    <Key name="Exposure Method">0</Key>
    <Key name="Target Value">140</Key>
    <Key name="Target Percentile">65</Key>
    <Key name="Target Accept Gap">32</Key>
    <Key name="Max Exp">519</Key>
    <Key name="Max Gain">1</Key>
    <Key name="Conform Image">0</Key>
    <Key name="Conform Tries">1</Key>
    <Key name="Specular Exclusion">0</Key>
    <Key name="Specular Sat">200</Key>
    <Key name="Specular Limit">1</Key>
  </Section>
  <Section name="Processing">
    <Section name="Histogram Stretch">
      <Key name="Flags">1</Key>
      <Key name="Low">2</Key>
      <Key name="High">2</Key>
      <Key name="Mode">1</Key>
    </Section>
    <Section name="Gamma Correction">
      <Key name="Flags">1</Key>
      <Key name="Gamma">0.45</Key>
    </Section>
  </Section>
  <Section name="Settings">
    <Key name="Aimer">0</Key>
    <Key name="Illumination">1</Key>
  </Section>
</Section>
</ConfigDoc>
```

The data structure illustrated in Table 6 is organized into sections (separated by </section>tags), with each top level sections corresponding to an image profile. Each image profile is further divided into three sections: a first for exposure settings (Automatic or Manual Exposure Control); a second for image functions (Processing); and a third for aimer and illumination settings (Settings).

The exposure settings section will indicate a desired mode (fixed or automatic in the illustrated examples) of exposure control and provide a series of keys corresponding to parameter settings therefore. It is to be noted that the modes and parameters therefore will be dictated by the imaging hardware utilized and the calls made available by any APIs (such as a scan driver API and/or an imaging API). The overall purpose of the exposure control section is to control the total amount of light allowed to fall on the image sensor during the process of capturing an image.

The image function section contains an ordered list of post capture image functions to be applied to captured frames. The processing section is divided into sub-sections, one for each instance of an image process to be applied (in the order in which they are to be applied). Each image process sub-section may contain keys corresponding to parameter settings for each image process. A flag may also be included indicate whether the image process described by that section is to be executed during the aiming stage, or whether the image process is to be executed only as part of the final capture stage. It is to be noted that the availability of any particular image process may vary from device to device and between suppliers of imaging hardware and software.

The illumination and aimer settings section contains a first entry indicating whether illumination is to be used (and perhaps a configuration thereof). A second entry indicates whether an aimer is to be projected (and perhaps a configuration thereof).

Figure 4A:
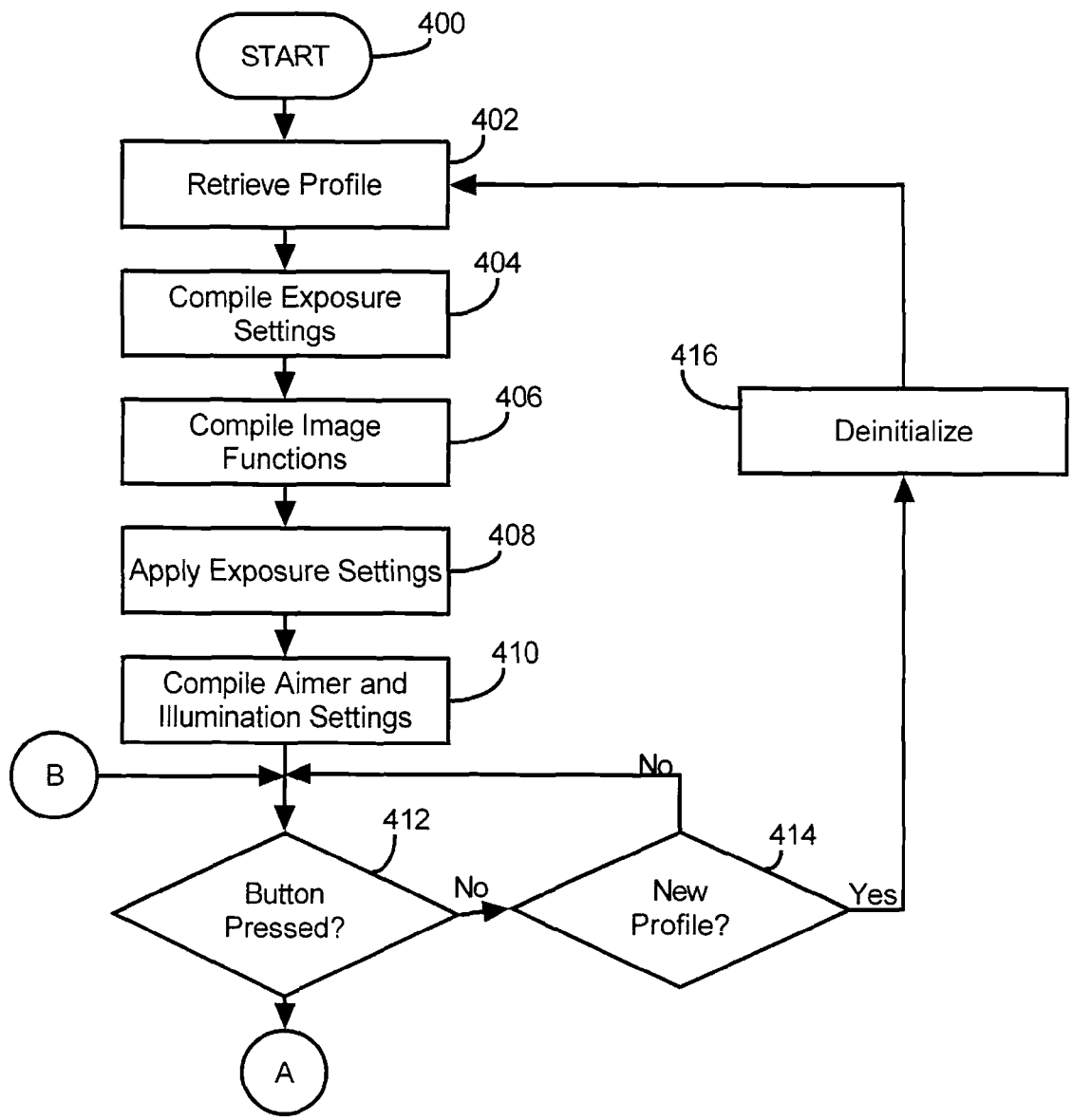
FIG. 4A is a flow chart of a method in accordance with an embodiment of the present invention.
Figure 4B:
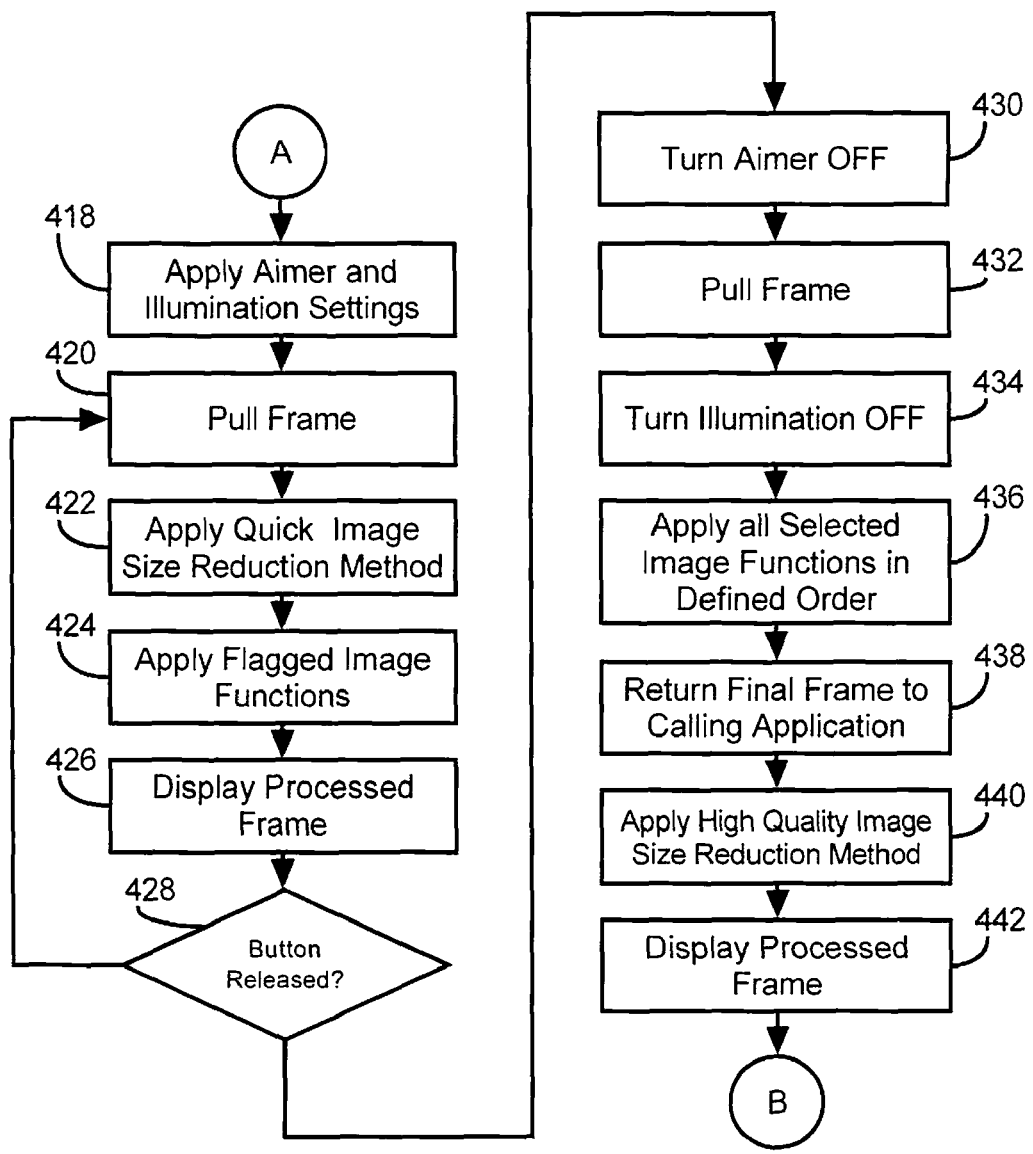
FIG. 4B is a flow chart of a method in accordance with an embodiment of the present invention.

FIG. 4A is a flow chart of a method in accordance with an embodiment of the present invention. FIG. 4B is a continuation of the flow chart set forth in FIG. 4A. In particular, FIGS. 4A and 4B illustrate one method for using image profiles, including those describe above with respect to FIG. 3 and as illustrated in Tables 5 and 6. The method starts in step 400. In step 402 a profile is retrieved. In the case of the document illustrated in Table 6, the XML document containing the desired profile is retrieved and the desired profile is identified. Next in step 404, exposure settings are compiled. The exposure settings may be compiled by loading the values (also referred to as parameters) of the exposure settings into a memory structure suitable for transfer to the imager—for example via a Scan Driver API call. Next in step 406, image functions are compiled. The image functions may be compiled by creating a list of calls, with appropriate parameters, values and data structures associated with such calls. In step 408, the exposure settings are applied to the imaging hardware. This is typically performed using a call, passing the data structure compiled in step 404, to one or more routines in the scan driver API 330. Thereafter, aimer and illumination settings are compiled in step 410. Again, this may comprise the creation of a data structure in a memory containing the parameters associated with the aimer and illumination settings.

In step 412, a check is made to determine whether a button has been pressed to initiate an image capture operation. In the simplest use case, the button is the scan button 1036. It is to be noted that any designated button may be used, as may soft keys or menu items. As described hereinabove, in an image capture operation, the image signal generation system 1028 may be operated in two distinct stages; aiming and final capture. During the aiming stage, frames output by the image signal generation system 1028 are displayed on the LCD display 1020 but not saved. Once a user is satisfied with the content of the image displayed on the LCD display 1020, he or she initiates the final capture stage to save a frame to a memory location.

If the user has not pressed the scan button, the method proceeds to step 414 and a determination is made as to whether a new profile has been selected. If a new profile has not been selected, the method will return to step 412. If a new profile has been selected the method proceeds to step 416 and a de-initialize command is issued. Thereafter, the method returns to step 402 in which the new profile is retrieved.

Once a scan button press is sensed in step 412, the method proceeds to step 418 in FIG. 4B. In step 418, aimer and illumination settings are applied. Next, in step 420, a frame is pulled from an imager buffer in the image signal generating system 1028 using, for example, the imgCaptureImage command. This frame should have been captured using the exposure settings applied in step 408. Thereafter, in step 422 a quick image size reduction method is applied to the frame pulled in step 420.

A quick image size reduction method is one that emphasizes speed over versatility. In general, most imagers used in PDT are capable of producing images having more pixels than the LCD display is capable of displaying. For example, the typical image may have a resolution of 640×480 pixels (or even 752×480 or 1280×960) while a typical display on a PDT may only have a resolution of 240 by 320 pixels. Therefore, for the user to view the whole image, the frame must be resized. To keep the frame rate high, a quicker resize method may be preferable, for example, simply selecting one out of every three pixels for display. While there are a variety of versatile resizing methods that produce superior images, they tend to consume processor cycles—which may slow the frame rate during the aiming stage.

Next in step 424, image functions that have been flagged for use during the aiming phase are processed. Using the example profiles set forth in Table 6, each image processing section includes a Flag key, which may be set to 1 or 0. If the flag is set to "1", the image process is designated for use during the aiming stage (and the final image stage). If the flag is set to "0", the image process is designated for use only during the final image stage. By running only select image functions, the frame rate of the display during the aiming stage may be increased—thereby ensuring that the images the user sees at any instance are closely related to the image produced should the user select that instance to produce a final image. Further, certain image functions may interfere with or confuse the processes of aiming. e.g. flipping horizontally or vertically would only confuse the user during the aiming stage.

Thereafter in step 426, the frame, as processed in steps 422 and 424, is displayed. In step 428, a determination is made as to whether the button. e.g. the scan button 1036, has been released—indicating a desire on part of the user to initiate the final capture stage. If the button has not been released. i.e. the user is still aiming, the method returns to step 420 and the next frame is pulled. If the button has been released, i.e. the user has indicated that he or she desires a final frame capture, the method proceeds to step 430.

The final capture stage starts in step 430, wherein the aimer is turned OFF. This is to avoid any ill effect that the inclusion of reflected aimer light in a captured frame may produce. Thereafter, in step 434, a final frame is pulled. Next, in step 434, the illumination is turned OFF. In step 436, each image function listed in the "processing" section is sequentially performed in order. This may include performing selected image functions more that one time wherein each time may utilize a different set of parameters.

Next in step 438, the final frame, as modified by the applied image functions, is returned to a calling application. At this point the final frame is typically saved to a more persistent memory location. Thereafter, in step 440, the image is resized for display on the PDT. As frame rate is no long a concern, a resize function that emphasizes versatility or quality over speed may be utilized. For example a variable resize method (e.g ¼, ½, ⅔) may be utilized. Thereafter, in step 442, the resized frame is displayed on the PDT.

Figure 5A:
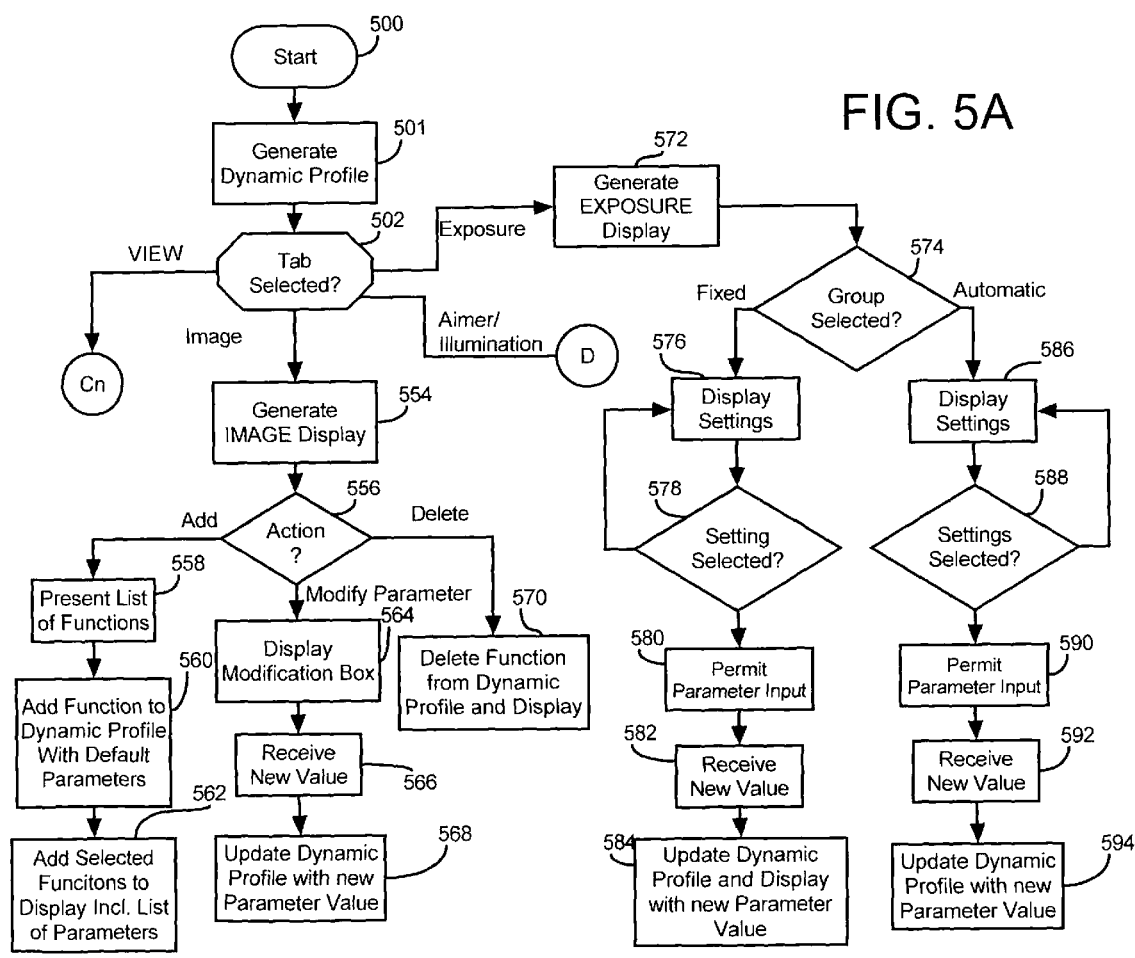
FIG. 5A is a flow chart of a method in accordance with an embodiment of the present invention.
Figure 5B:
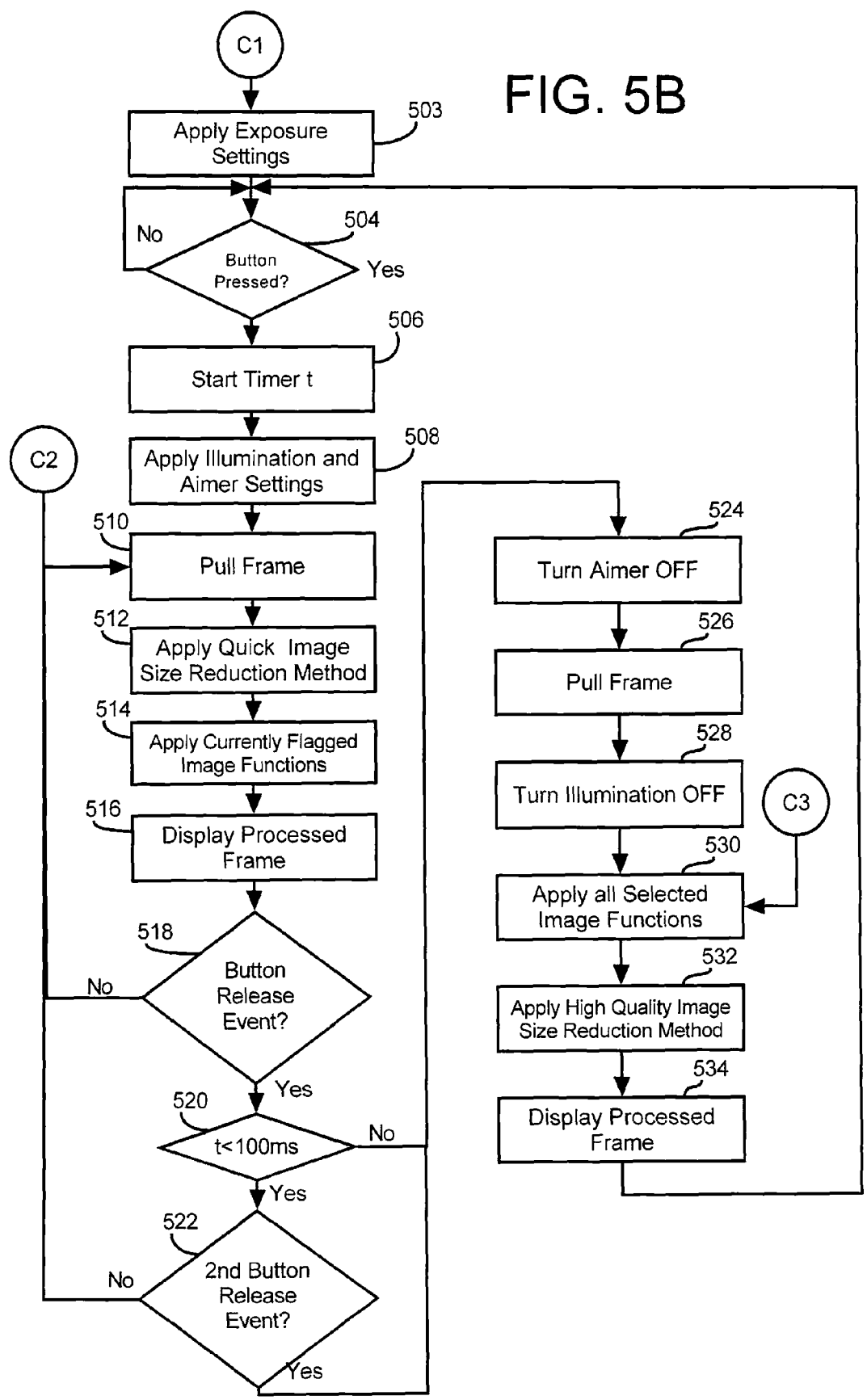
FIG. 5B is a flow chart of a method in accordance with an embodiment of the present invention.
Figure 5C:
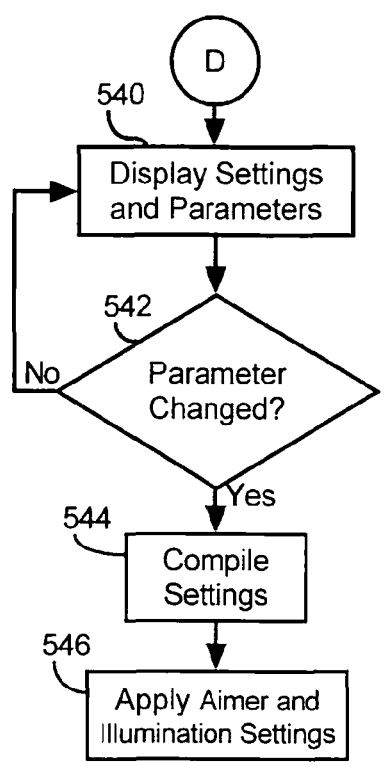
FIG. 5C is a flow chart of a method in accordance with an embodiment of the present invention.

FIGS. 5A, 5B and 5C are flow charts of a method for generating profiles in accordance with an embodiment of the present invention. FIGS. 6A, 6B, 6C, and 6D are illustrations of a user interface for implementing the method shown in FIGS. 5A, 5B and 5C. In effect, the described methods place the PDT into a profile generation mode allowing a user to interactively generate image profiles using, for example, a tabbed display as illustrated in FIGS. 6A, 6B, 6C, and 6D.

The method starts in step 500. In step 501, a dynamic profile is generated. The dynamic profile may be implemented as a data structure in a memory on the PDT containing a set of parameters indicative of: illumination/aimer settings; exposure settings; and image functions. The dynamic profile may be based on a set of default illumination/aimer and exposure settings. It may prove preferable to leave the image process section empty. Step 501 may be considered as compiling a profile, similar in manner to step 404 and 406 set forth in FIG. 4A, utilizing a set of default values.

In step 502, a user is presented with a blank screen upon which he or she may select one of four tabs. Referring to FIG. 6n, the illustrated tabs are: a VIEW tab 602; an IMAGE tab 604; and an EXPOSURE tab 606 and an A/I tab 608. If the user selects the VIEW tab 602 (or if the method defaults to the VIEW tab 602 upon startup), the method proceeds to the steps illustrated in FIG. 5B. If the user selects the IMAGE tab 604, the method proceeds to step 554. If the user selects the EXPOSURE tab 606, the method proceeds to step 572. If the user selects the A/I tab 608, the method proceeds to the steps illustrated in FIG. 5C.

When the VIEW tab 602 is first selected, the viewing method starts with C1 at step 503, wherein current exposure settings from the dynamic profile are applied. Next in step 504, a determination is made as to whether a button (e.g. the scan button 1036 or other button or menu item used to initiate the aiming phase) has been pressed. Once the button is pressed, a timer t is started in step 506.

The time is used to determine which of two modes a user wishes to implement for the aiming stage. The first mode, termed the normal mode, is as described hereinabove with reference to FIGS. 4A and 4B. In the normal mode, the aiming stage is maintained for as long as the user presses the button. To initiate the final capture stage, the user releases the button. As may be appreciated, it may prove difficult for many users to maintain pressure on the button while simultaneously modifying settings and functions (not to mention the various parameters thereof). To assist with generation of a profile, a new mode of imager operation, hereinafter termed the automatic mode. To enter the automatic mode, the user presses and quickly releases the button—for example within 100 ms. In the automatic mode, the imager is maintained in the aiming stage until the user indicates a desire to exit, for example by pressing and releasing the button or selecting a menu entry. It is to be recognized that alternative methods may be used to enter the automatic aiming mode, including the pressing of a designated key to the activation of a menu item.

In either mode of operation, once the button has been pressed, current aimer and illumination settings from the dynamic profile are applied in step 508. Next, in step 510 an image frame is pulled from the imager buffer. The image frame should have been generated using the current exposure settings contained within the dynamic profile. Thereafter, in step 512 a quick image size reduction method is applied to the frame pulled in step 510. As noted hereinabove, one possible quick image size reduction method comprises simply selecting one out of every three pixels for display.

Next in step 514, image processing functions that are currently selected and flagged for use during the aiming phase are executed. Thereafter in step 516, the frame, as processed in step 512 and 514 is displayed as an image 609 within the display 600*a*.

In step 518, a determination is made as to whether a button release event has issued—either indicating a desire to enter the automatic mode or to enter the final capture stage. If no button release event has issued, the method returns to step 510 wherein the next frame is pulled (using the then current exposure settings as stored in the dynamic profile). If a button release has occurred, a determination must be made as to whether the user is indicating a desire to enter the automatic mode or if the user desires to enter the final capture stage. In step 520 the timer t is compared against a pre-selected value—in the illustrated example 100 ms. If the timer is less than the pre-selected value, the user has indicated a desire to enter the automatic mode—to be exited upon subsequent pressing and release of the button. To ensure that the user has not quickly indicated entry and exit of the automatic mode, a check is made in step 522 to determine if button release event is the second button release event. If the button release event is not the second button release event, the user has indicated a desire to enter the automatic mode and the method returns to step 510. If either t is greater than the pre-selected value or the button release event is a second button release event, the method enters the final capture stage by going to step 524.

During either aiming mode (automatic or normal) a user may select another tab (604, 606, or 608) to dynamically adjust exposure and image processing options. During such adjustments, the view method may continue to run as a background process or it may be suspended until the user re-selects the view tab 602. If the view method is suspended, reentry may be made at C2 (step 522). This allows a user to immediately see the effects of his or her choices on the image 608.

Once the user has initiated the final capture mode, the method proceeds to step 524 wherein the aimer is turned OFF. This is to avoid any ill effect that the inclusion of reflected aimer light may produce. Thereafter, in step 526, a final frame is pulled. Next, in step 528, the illumination is turned OFF. In step 530, the selected image functions are sequentially performed in order. As noted this may include performing selected image functions more than once (perhaps with varying parameters). Next in step 532, the image is resized for display on the PDT. As frame rate is no long a concern, a high quality resize function may be utilized. Thereafter, in step 534, the resized frame is displayed on the display of the PDT as an image 609 within the display 600*a*. While not explicitly illustrated, the display is maintained until replaced with another frame or a display associated with another tab. Thereafter, the method returns to step 504 to await another button press.

During or after final image capture a user may select another tab (604, 606, or 608) to dynamically adjust exposure and image processing options. During such adjustments, the final frame may be maintained in a buffer until the user re-selects the view tab 602. Reentry may be made at C3 (step 530) in which all selected image functions are applied. This allows a user to immediately see the effects of his or her choices on the image 608. As may be appreciated, it may be preferable to store an unmodified copy of the final frame such that the new regiment of image functions may be applied to the original frame—as opposed to being applied to a previously modified frame. In this case, the stored unaltered frame may be loaded into the frame capture buffer prior to returning at C3.

FIG. 5B illustrates, by way of example and to simplify the explanation thereof three entry points: C1—associated with initial entry, C2—associated with reentry to the aiming stage; and C3 associated with reentry to the final capture stage. It is to be noted that the described method may be implemented as an event driven system. In such a case exit from, entry to or reentry to the method illustrated in FIG. 5B will be controlled by events, which may occur at any time during the processing (as opposed to the exact points indicated by C2 and C3). In general, the reentry point would be the step during which (or just after which) an event issued. In other words, the choice of entry points is decided by a prior state of the processing when exiting from the VIEW tab 602

Figure 6A:
FIG. 6A is an illustration of a user interface for implementing the method shown in FIG. 5B.
Figure 6B:
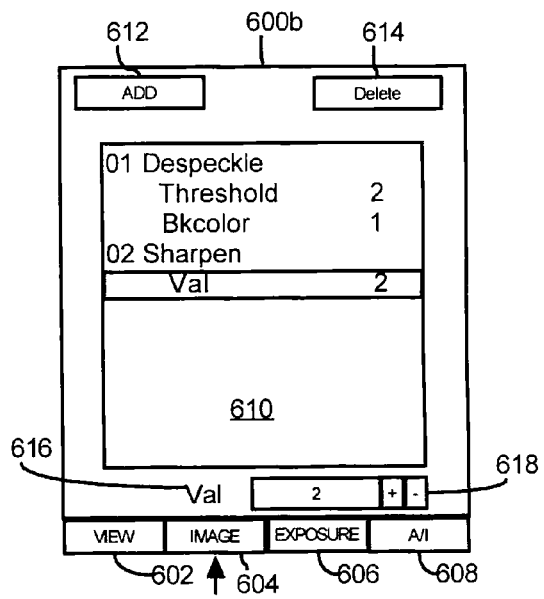
FIG. 6B is an illustration of a user interface for implementing the method shown in FIG. 5A.

At any time if the user selects the IMAGE tab 604, the method proceeds to step 554 wherein, referring to FIG. 6B, an IMAGE display 600*b* is generated. The display 600*b* generally comprises a main window 610: an add button 612; a delete button 614; an indication 616 of a currently selected parameter; and modification box 618 in which a value associated with the currently selected parameter may be set. A determination is made in step 556 as to a desired action; adding a process (indicated by selecting the add button 612); modifying a parameter (indicated by selecting a parameter); or deleting a process (indicated by selecting the delete button 614).

If the user selects the add button 612, the method proceeds to step 558 and a list of available image functions is presented to the user. Once the user selects an available image process, the process is added to the dynamic profile with default parameter values in step 560. Thereafter, in step 562, the display 600*b* is updated to add the new image process (and associated parameters) to the main window 610.

If, in step 556, the user chooses to modify a parameter, for example by selecting a parameter displayed in the main window 610, the method proceeds to step 564. In step 564, a modification box 618 is displayed permitting user modification of the value associated with the selected parameter in step 566. Thereafter, in step 568, the dynamic profile is updated with the new value.

If the user selects the delete button 614, the method proceeds to step 570 wherein a selected image process is deleted from the dynamic profile and the main window 610 of the display 600*b*.

After completion of the steps associated with adding, modifying or deleting functions, the method waits for an indication from the user of a next action to take. e.g. add or delete a process; modify a parameter; or switch tabs. If the user selects the view tab 602 it may prove beneficial to maintain the display of the indication 616 of a currently selected parameter and the associated modification box 618 in addition to the normal content of the view tab 602. This will allow the user to adjust the value of the parameter and dynamically view the results on the image 608.

Figure 6C:
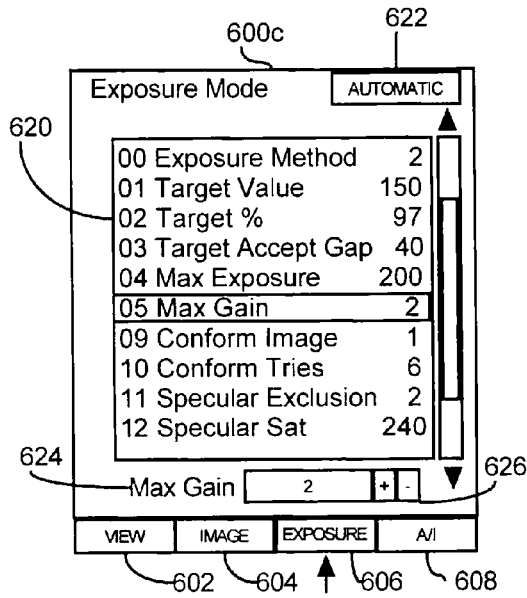
FIG. 6C is an illustration of a user interface for implementing the method shown in FIG. 5A.

At any time if the user selects the EXPOSURE tab 606, the method proceeds to step 572 wherein, with reference to FIG. 6C, an EXPOSURE display 600*c* is generated. The display 600*c* generally comprises a main window 620; an exposure mode selection box 622; an indication 624 of a currently selected parameter; and modification box 626 in which a value associated with the currently selected parameter may be set.

A determination is made in step 574 as to a desired exposure mode: the illustrative examples have described two such modes: automatic and fixed. Once the exposure mode has been selected (either by the user or by default) the method proceeds either to step 576 for the fixed exposure mode or to step 568 for the automatic exposure mode. Both branches have similar steps. First, a display 620 of parameters is created (steps 576 and 586). Once a parameter has been selected (steps 578 and 588), a modification box 626 is displayed permitting user modification of the value associated with the selected parameter. A new value is received in step 582 or 592. Thereafter, in step 584 or 594, the dynamic profile is updated with the new value. Thereafter the method waits for an indication from the user of a next action to take, e.g. modify a new parameter; switch exposure modes or even switch tabs. It may prove beneficial to maintain the display of the indication 624 of a currently selected parameter and the modification box 626 for a currently selected parameter when the user returns to the view tab 602. This will allow the user to adjust the value of the parameter and dynamically view the results on the image 608.

Figure 6D:
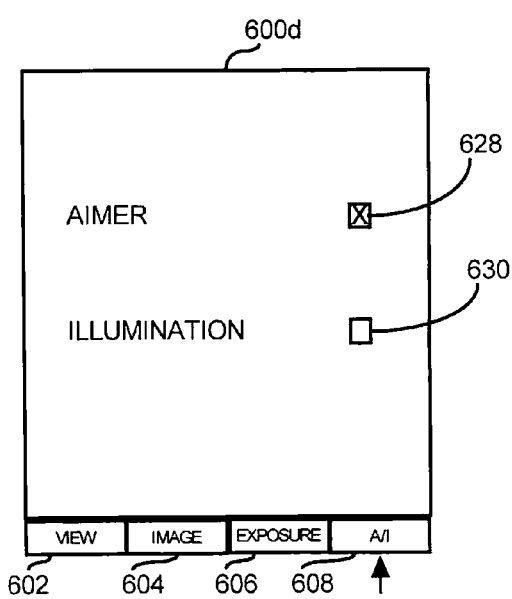
FIG. 6D is an illustration of a user interface for implementing the method shown in FIG. 5C.

At any time if the user selects the A/I tab 608, the method proceeds to step 540 in FIG. 5C wherein, with reference to FIG. 6D, an A/I display 600*d* is generated. The display 600*d* generally comprises an aimer mode selection check box 626 and an Illumination mode selection checkbox 630.

In step 542 a determination is made as to whether a parmeter has been changed e.g. a box has been checked or unchecked. If a change has been made the method proceeds to step 544 and the aimer and illumination settings are compiled. Thereafter in step 546, the aimer and illumination settings are applied. Thereafter, the method waits for an indication from the user of a next action to take. e.g. modify a new parameter or switch tabs. It may prove beneficial to maintain the display of the check boxes 628 and 630 when the user returns to the view tab 602. This will allow the user to adjust the aiming and illumination and observe the results.

At any time during the illustrative method, the user may jump from tab to tab, and within tabs the user may jump to any of the desired actions. e.g. add; delete; or modify. The method ends when the user indicates a desire to end—for example by exiting the program or shutting down the PDT.

Although some embodiments of the present invention have been shown and described, it will be appreciated by those skilled in the art that changes may be made in these embodiments without departing from the principles and spirit of the invention, the scope of which is defined in the claims and their equivalents. The embodiments described herein focus on the preparation and use of image profiles useful for an image capture operation. It is to be recognized that other types of profiles may be prepared and used for other data capture operations performed by portable data terminals. For example decode profiles could be prepared and used in a decoding operation wherein many of the parameters and processed used in image capture are implemented in addition to the decoding processes. RFID profiles could be used to configure an RFID reader unit for various operating environments.

What is claimed is:

1. A method for operating an imager in a portable data collection device, the method comprising the steps of:
    illuminating an object;
    aiming a target onto the object;
    exposing an image sensor to capture an image of the object;
    holding profiles for operating the imager in one or more situations, each profile comprising one or more data structures, each data structure having parameter values;
    selecting and storing a value for each selected parameter in each data structure of each profile;
    selecting one of the profiles;
    controlling one or more of the steps of the group consisting of exposing, image processing, displaying, illuminating and aiming in accordance with the parameter values in the selected profile;
    processing the captured image, including attempting to decode a bar code represented in the captured image;
    displaying the processed image;
    contacting a representative about unsuccessful decoding, wherein the representative creates a profile to solve the unsuccessful decoding and provides the operator with the created profile to attempt to solve the unsuccessful decoding; and,
    operating the imager in accordance with the created profile.

2. The method of claim 1 wherein the step of processing a captured image further comprises:
    selecting one or more image processing functions, each image processing function having one or more parameters with selectable values, and
    storing selected image processing functions, selected image processing parameters and selected image processing parameter values in a data structure of a profile.

3. The method of claim 2 wherein the selected image process functions are applied in sequence to create a processed frame for the display.

4. A method, as set forth in claim 2, further comprising:
    designating which image functions in each series of image functions is to be applied to frames captured in an aiming stage and not in a final image capture stage.

5. A method, as set forth in claim 4, wherein the step of applying comprises:
    if the portable data collection device is in an aiming mode, applying the designated image functions to the captured frame; and
    if the portable data collection device is in a final capture mode, applying each of the image functions in the series of image functions to the captured frame to create a processed frame.

6. A method, as set forth in claim 4, wherein:
    if the portable data collection device is in an aiming mode, creating a display frame by skipping every n pixel, n being selected based on a size of the processed frame and the size of a display and displaying the display frame on the display; and
    if the portable data collection device is in a final capture mode, transmitting a copy of the processed frame to a designated location, applying a resize process to generate a display frame having a desired size, and displaying the display frame on the display.

7. A portable data collection device comprising:
    an imager comprising: an illuminator for illuminating an object, an aimer for aiming a target onto the object and an image sensor for capturing an image of the object;
    a memory;
    a communication device;
    a processor;
    profiles stored on said memory for operating the imager in one or more situations, each profile comprising one or more data structures, each data structure having parameter values;

machine readable instructions stored on said memory that cause the processor to perform the steps of:
selecting and storing in the memory a value for each selected parameter in each data structure of each profile;
selecting one of the profiles;
controlling one or more of the steps of the group consisting of exposing, image processing, displaying, illuminating, and aiming in accordance with the parameter values in the selected profile;
processing a captured image, including attempting to decode a bar code represented in the captured image;
displaying the processed image;
determining if an attempted decode is unsuccessful; and
causing the communication device to contact a representative about the unsuccessful decoding and to receive a profile from the representative to attempt to solve the unsuccessful decoding.

8. The device of claim 7:
wherein the processor is further adapted for:
selecting one or more image processing functions, each image processing function having one or more parameters with selectable values, and
storing selected image processing functions, selected image processing parameters and selected image processing parameter values in a data structure of a profile.

9. The device of claim 8 wherein the selected image process functions are applied in sequence to create a processed frame for the display.

10. A device, as set forth in claim 8, further comprising:
designating which image functions in each series of image functions is to be applied to frames captured in an aiming stage and not in a final image capture stage.

11. A device, as set forth in claim 10, wherein the step of applying comprises:
if the portable data collection device is in an aiming mode, applying the designated image functions to the captured frame; and
if the portable data collection device is in a final capture mode, applying each of the image functions in the series of image functions to the captured frame to create a processed frame.

12. A device, as set forth in claim 10, wherein:
if the portable data collection device is in an aiming mode, creating a display frame by skipping every n pixel, n being selected based on a size of the processed frame and the size of a display and displaying the display frame on the display; and
if the portable data collection device is in a final capture mode, transmitting a copy of the processed frame to a designated location, applying a resize process to generate a display frame having a desired size, and displaying the display frame on the display.

13. A device, as set forth in claim 7, wherein the display displays a name for a selected parameter and the value stored for the selected parameter and further comprising an input device which can change the stored value of the displayed parameter.

14. A device, as set forth in claim 13, wherein the stored set of values are stored in a plurality of data structures, each of which includes an identification of a parameter and the stored value of the parameter.

* * * * *